US006628502B2

(12) United States Patent
Masumiya et al.

(10) Patent No.: US 6,628,502 B2
(45) Date of Patent: Sep. 30, 2003

(54) MULTILAYER CERAMIC CHIP CAPACITOR AND METHOD FOR PRODUCING SAME

(75) Inventors: Kaori Masumiya, Chuo-ku (JP); Takeshi Masuda, Chuo-ku (JP); Takeshi Nomura, Chuo-ku (JP); Yukie Nakano, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 146 days.

(21) Appl. No.: 09/820,733

(22) Filed: Mar. 30, 2001

(65) Prior Publication Data

US 2001/0035563 A1 Nov. 1, 2001

(30) Foreign Application Priority Data

Mar. 31, 2000 (JP) ........................................ 2000-098507
Feb. 22, 2001 (JP) ........................................ 2001-046406

(51) Int. Cl.[7] ................................................ H01G 4/06
(52) U.S. Cl. ................................ 361/321.2; 361/321.5
(58) Field of Search ............................ 29/25.41, 25.42; 361/306.3, 320, 321.1, 321.2, 321.3, 321.4, 321.5; 501/134, 135, 136, 138

(56) References Cited

U.S. PATENT DOCUMENTS 5,567,964 A * 10/1996 Kashihara et al. .......... 257/310
6,403,513 B1 * 6/2002 Sato et al. .................. 501/137

FOREIGN PATENT DOCUMENTS

| | | |
|---|---|---|
| JP | A 6-84692 | 3/1994 |
| JP | A 6-342735 | 12/1994 |
| JP | A 7-335474 | 12/1995 |
| JP | A 8-124784 | 5/1996 |
| JP | A 8-124785 | 5/1996 |
| JP | A 9-241074 | 9/1997 |
| JP | A 9-241075 | 9/1997 |

* cited by examiner

*Primary Examiner*—Anthony Dinkins
(74) *Attorney, Agent, or Firm*—Oliff & Berridge, PLC.

(57) ABSTRACT

A method of production of a multilayer ceramic chip capacitor having a capacitor body configured by alternately stacked dielectric layers and internal electrode layers, having using as a powder ingredient of barium titanate for forming the dielectric layers a powder ingredient having a ratio ($I_{(200)}$/Ib) of a peak intensity ($I_{(200)}$) of a diffraction line of a (200) plane with respect to an intensity (Ib) at an intermediate point between an angle of a peak point of diffraction line of a (002) plane and an angle of a peak point of diffraction line of a (200) plane in an X-ray diffraction chart of 4 to 16.

20 Claims, 3 Drawing Sheets

MULTILAYER CERAMIC CHIP CAPACITOR AND METHOD FOR PRODUCING SAME

BACKGROUND OF THE INVENTION

1. Field of the Invention

The present invention relates to a multilayer ceramic chip capacitor enabling an improvement in the specific dielectric constant and a reduction in the dielectric loss and superior in capacity-temperature characteristic even when the dielectric layers are thin and a method for production of the same.

2. Description of the Related Art

Extensive use is being made of multilayer ceramic chip capacitors as electronic devices due to their small size, large capacity, and high reliability. Large numbers are also used in single electronic apparatuses. In recent years, along with the increasingly smaller size and high performance of apparatuses, there have been stronger demands for further reduction of the size, increase of the capacity, and improvement of the reliability of multilayer ceramic chip capacitors.

A multilayer ceramic chip capacitor is ordinarily produced by stacking an internal electrode paste and dielectric paste by the sheet method, printing method, etc. and cofiring them. In general, Pd or a Pd alloy is used for the electroconductive material for the internal electrodes. Pd is high in cost, so relatively inexpensive Ni or Ni alloys or other base metals are now being used. When using a base metal as the electroconductive material of the internal electrodes, if firing in the atmosphere, the internal electrode layers end up oxidizing, so it is necessary to cofire the dielectric layers and the internal electrode layers in a reducing atmosphere. If firing in a reducing atmosphere, however, the dielectric layers are reduced and the specific resistance ends up becoming lower. Therefore, nonreducing dielectric materials are being developed.

To reduce the size and/or increase the capacity of a multilayer ceramic chip capacitor, it is necessary to make the layers of the dielectric thinner and/or increase the number of layers. Further, it is necessary to use a dielectric with a high dielectric constant. At the present time, layers are being reduced in thickness to give less than 3 $\mu$M between layers. If the dielectric layers are made thinner, however, the electric field acting on the dielectric layers becomes strong when applying voltage, so the dielectric loss becomes remarkably greater and the capacity-temperature characteristic also ends up deteriorating.

On the other hand, to prepare a dielectric with a high dielectric constant, there is the method of increasing the crystal grain size of the dielectric layers such as by increasing the grain size of the ingredient powder forming the main component of the dielectric layers.

As nonreducing dielectric magnetic compositions enabling a reduction in thickness to less than 3 $\mu$m, there are for example the barium titanate type disclosed for example in Japanese Unexamined Patent Publication (Kokai) No. 9-241074 and Japanese Unexamined Patent Publication (Kokai) No. 9-241075. These however have a dielectric constant of 1000 to 2500 or so. Ones with a high dielectric constant become too large in dielectric loss.

SUMMARY OF THE INVENTION

An object of the present invention is to provide a multilayer ceramic chip capacitor enabling an improvement in the specific dielectric constant and a reduction in the dielectric loss and superior in capacity-temperature characteristic even when the dielectric layers are thin and a method for production of the same.

To achieve the above object, there is provided a method of production of a multilayer ceramic chip capacitor having a capacitor body configured by alternately stacked dielectric layers and internal electrode layers, comprising using as a powder ingredient of barium titanate for forming the dielectric layers a powder ingredient having a ratio ($I_{(200)}$/Ib) of a peak intensity ($I_{(200)}$) of a diffraction line of a (200) plane with respect to an intensity (Ib) at an intermediate point between an angle of a peak point of a diffraction line of a (002) plane and an angle of a peak point of a diffraction line of a (200) plane in an X-ray diffraction chart of 4 to 16. Preferably, the ratio ($I_{(200)}$/Ib) is 5 to 15.

Preferably, the powder ingredient of barium titanate has mixed in it a first subcomponent ingredient forming silicon oxide (first subcomponent) after firing.

The molar ratio of the first subcomponent to 100 moles of the main component $BaTiO_3$, when calculating the molar ratio by converting the barium titanate included in the dielectric layers after firing to $BaTiO_3$ and the silicon oxide to $SiO_2$, is preferably not less than 2 moles and not more than 12 moles, more preferably not less than 2 moles and not more than 6 moles.

The powder ingredient of the barium titanate preferably has mixed in it a second subcomponent ingredient forming an R oxide (where R is at least one type of element selected from Sc, Y, Eu, Dy, Ho, Er, Tm, Yb, and Lu; second subcomponent) after firing.

The molar ratio of the second subcomponent to 100 moles of the main component $BaTiO_3$, when calculating the molar ratio by converting the barium titanate included in the dielectric layers after firing to $BaTiO_3$ and the R oxide to $R_2O_3$, is preferably from 0 to not more than 5 moles, more preferably not less than 0.1 mole and not more than 3 moles.

The powder ingredient of the barium titanate preferably has mixed in it a third subcomponent ingredient forming at least one of magnesium oxide, zinc oxide, and chromium oxide (third subcomponent) after firing.

The molar ratio of the third subcomponent to 100 moles of the main component $BaTiO_3$, when calculating the molar ratio by converting the barium titanate included in the dielectric layers after firing to $BaTiO_3$, the magnesium oxide to MgO, the zinc oxide to ZnO and the chromium oxide to ½($Cr_2O_3$), is preferably from 0 to not more than 3 moles, more preferably from 0 to not more than 2.5 moles.

The powder ingredient of the barium titanate preferably has mixed in it a fourth subcomponent ingredient forming manganese oxide (fourth subcomponent) after firing.

The molar ratio of the fourth subcomponent to 100 moles of the main component $BaTiO_3$, when calculating the molar ratio by converting the barium titanate included in the dielectric layers after firing to $BaTiO_3$ and the manganese oxide to MnO, is preferably from 0 to not more than 1 mole, more preferably from 0 to not more than 0.5 mole.

The powder ingredient of the barium titanate preferably has mixed in it a fifth subcomponent ingredient forming at least one of barium oxide, calcium oxide, and strontium oxide (fifth subcomponent) after firing.

The molar ratio of the fifth subcomponent to 100 moles of the main component $BaTiO_3$, when calculating the molar ratio by converting the barium titanate included in the dielectric layers after firing to $BaTiO_3$, the barium oxide to BaO, the calcium oxide to CaO and strontium oxide to SrO, is preferably from 0 to not more than 12 moles, more preferably not less than 2 moles and not more than 6 moles.

The powder ingredient of the barium titanate preferably has mixed in it a sixth subcomponent ingredient forming vanadium oxide (sixth subcomponent) after firing.

The molar ratio of the sixth subcomponent to 100 moles of the main component $BaTiO_3$, when calculating the molar ratio by converting the barium titanate included in the dielectric layers after firing to $BaTiO_3$ and the vanadium oxide to $V_2O_5$, is preferably from 0 to not more than 0.5 mole, more preferably from 0 to not more than 0.2 mole.

The specific surface area of the powder ingredient of the barium titanate is preferably 1.0 to 8.0 $m^2/g$, more preferably 1.0 to 4.0 $m^2/g$.

If the ratio ($I_{(200)}/Ib$) of the peak intensity of the diffraction line is less than the above range, the dielectric loss of the obtained capacitor becomes larger. Preparation of samples with a ratio ($I_{(200)}/Ib$) of peak intensity of the diffraction line over the above range is difficult.

If the specific surface area is less than the above range, the grain size of the ingredient powder becomes large and the IR accelerated lifetime tends to become poor when the layer is made thin. Further, preparation of samples with a specific surface area over the above range is difficult.

If the content of the first subcomponent is less than the above range, the sinterability will deteriorate. If the content is over the above range, the permittivity tends to fall. If the content of the second subcomponent is over the above range, the permittivity tends to fall and the sinterability to deteriorate. If the content of the third subcomponent is over the above range, the permittivity tends to fall and the capacity-temperature characteristic to deteriorate. If the content of the fourth subcomponent exceeds the above range, the permittivity tends to fall and the capacity-temperature characteristic to deteriorate. If the content of the fifth subcomponent exceeds the above range, the sinterability tends to deteriorate. If the content of the sixth subcomponent exceeds the above range, the permittivity tends to remarkably fall.

By controlling the characteristics in X-ray diffraction of the barium titanate ingredient powder comprising the dielectric layers to within the range of the present invention, it is possible to provide a large capacity multilayer ceramic chip capacitor having a high permittivity, a small dielectric loss, and a superior capacity-temperature characteristic.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
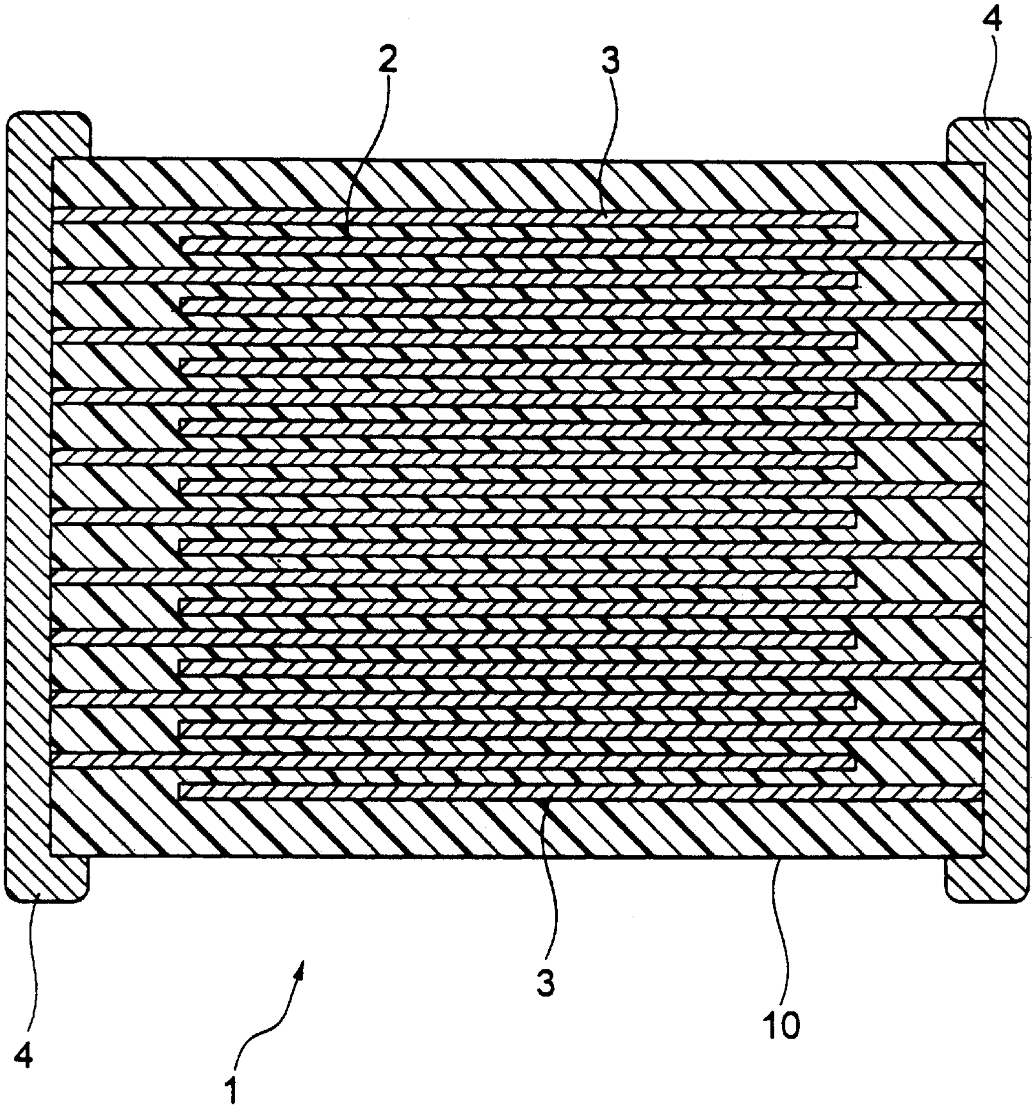
FIG. 1 is a schematic sectional view of a multilayer ceramic chip capacitor according to an embodiment of the present invention.

Next, the present invention will be explained based on the embodiments shown in the drawings.

Multilayer Ceramic Chip Capacitor

As shown in FIG. 1, a multilayer ceramic chip capacitor 1 of the present invention has a capacitor chip body 10 of a configuration of dielectric layers 2 and internal electrode layers 3 stacked alternately. External electrodes 4 conductive with the internal electrode 3 are provided at the outer surface of the capacitor chip body 10. The internal electrode layers 3 are stacked so that their ends are alternately exposed at the two opposing surfaces of the capacitor chip body 10 and the external electrodes 4 are formed at the two opposing outer surfaces of the capacitor chip body 10, whereby a predetermined capacitor circuit is formed.

The multilayer ceramic chip capacitor of the present invention is produced by preparing a green chip by a usual printing method or sheet method using a paste, firing this, then printing or transferring external electrodes and firing.

<Dielectric Layers 2>

The dielectric layers 2 are mainly comprised of barium titanate. The crystal of barium titanate is a tetragonal crystal system near ordinary temperature. In this case, in the X-ray diffraction chart shown in FIG. 2, the diffraction line at the (002) plane is observed near 2θ=44.9° and the diffraction line at the (200) plane is observed near 2θ=45.4°. When the angle and intensity of the peak point of the diffraction line of the (002) plane are $2\theta_{(002)}$ and $I_{(002)}$ and the angle and intensity of the peak point of the diffraction line of the (200) plane are $2\theta_{(200)}$ and $I_{(200)}$, in the present invention, the powder ingredient of barium titanate used is a powder ingredient of an $I_{(200)}/Ib$ of 4 to 16, more preferably 5 to 15. Note that $I_{(200)}/Ib$ is defined as follows. That is, the angle between the angle of the peak point of the diffraction line of the (002) plane and the angle of the peak point of the diffraction line of the (200) plane is 2θb, that is, $2\theta b=(2\theta_{(002)}+2\theta_{(200)})/2$ and the ratio of the peak intensity $I_{(200)}$ of the diffraction line of the (200) plane with respect to the intensity Ib at that intermediate angle 2θb is $I_{(200)}/Ib$. If $I_{(200)}/Ib$ is small, the dielectric loss becomes larger. Further, there is no upper limit on $I_{(200)}/Ib$, but the preparation of a powder ingredient outside of the range of the present invention is difficult.

Further, the powder ingredient of barium titanate preferably has a specific surface area of 1.0 to 8.0 $m^2/g$, more preferably 1.0 to 4.0 $m^2/g$. If the specific surface area is too small, when reducing the thickness, the IR accelerated lifetime becomes poorer. Further, if the specific surface area is too large, the permittivity falls and the capacity-temperature characteristic deteriorates. Note that the specific surface area of the powder ingredient corresponds to the mean grain size of the powder. If converting the specific surface area to grain size, in the present invention, the particle size of the powder ingredient is preferably 0.2 to 1.2 μm, more preferably 0.3 to 1.0 μm.

Further, the dielectric layers 2 may include, in addition to the barium titanate as a main component, silicon oxide as a first subcomponent, an R oxide (where R is at least one of Sc, Y, Eu, Dy, Ho, Er, Tm, Yb, and Lu) as a second subcomponent, at least one of magnesium oxide, zinc oxide, and chromium oxide as a third subcomponent, manganese oxide as a fourth subcomponent, at least one of barium oxide, calcium oxide, and strontium oxide as a fifth subcomponent, and vanadium oxide as a sixth subcomponent.

In this case, when calculating the molar ratios by converting the barium titanate to $BaTiO_3$, the silicon oxide to $SiO_2$, the R oxide to $R_2O_3$, the magnesium oxide to MgO, the zinc oxide to ZnO, and the chromium oxide to ½ ($Cr_2O_3$), the manganese oxide to MnO, the barium oxide to BaO, the calcium oxide to CaO, and the strontium oxide to SrO, and the vanadium oxide to $V_2O_5$, the ratios with respect to 100 moles of $BaTiO_3$ are the first subcomponent: not less than 2 moles to not more than 12 moles, preferably not less than 2 to not more than 6 moles, the second subcomponent: not less than 0 mole to not more than 5 moles, preferably not less than 0.1 to not more than 3 moles, the third subcomponent: not less than 0 mole to not more than 3 moles, preferably not less than 0 mole to not more than 2.5 moles, the fourth subcomponent: not less than 0 mole to not more than 1.0 mole, preferably not less than 0 mole to not more than 0.5 mole, the fifth subcomponent: not less than 0 mole to not more than 12 moles, preferably not less than 2 to not more than 6 moles, and the sixth subcomponent: not less than 0 mole to not more than 0.5 mole, preferably from 0 mole to not more than 0.2 mole.

If the content of the silicon oxide is less than the above range, the sinterability deteriorates. Further, if the content exceeds the above range, the permittivity tends to fall. If the content of the R oxide(rare earth oxide) is over the above range, the permittivity tends to fall and the sinterability to deteriorate. If the contents of the manganese oxide and the magnesium oxide are too large, the permittivity tends to fall and the capacity-temperature characteristic to deteriorate. If the content of the barium oxide+calcium oxide is over the above range, the sinterability tends to deteriorate. The oxidation state of the oxides is not particularly limited. The ratios of the above components are found by conversion to the above oxides from the ratios of the metal elements comprising the oxides.

Note that the powder ingredient of the barium titanate may also contain other subcomponent ingredients. As these other subcomponent ingredients, oxides of at least one element selected from Zr, Nb, Ta, La, Mo, W, Co, Ni, C, Pb, Bi, Al, and Li or compounds forming these oxides after firing may be mentioned.

<Internal Electrode Layers 3>

The electroconductive material contained in the internal electrode layers 3 is not particularly limited, but a base metal may be used since the material making up the dielectric layers 2 is resistant to reduction. As the base metal used as the electroconductive material, Ni or an Ni alloy is preferable. As the Ni alloy, an alloy of at least one element selected from Mn, Cr, Co, and Al with Ni is preferable. The content of Ni in the alloy is preferably at least 95 wt %.

Note that the Ni or Ni alloy may also contain up to about 0.1 wt % of P and other trace components.

The thickness of the internal electrode layers may be suitably determined in accordance with the application etc., but normally is 0.5 to 5 $\mu$m, in particular 0.5 to 2.5 $\mu$m.

<External Electrodes 4>

The electroconductive material contained in the external electrodes 4 is not particularly limited, but in the present invention, inexpensive Ni and Cu or alloys of the same may be used.

The thickness of the external electrode layers may be suitably determined in accordance with the application etc., but normally is 10 to 50 $\mu$m.

Method of Manufacturing Multilayer Ceramic Chip Capacitor

The multilayer ceramic chip capacitor of the present invention is produced by preparing a green chip by the usual printing method or sheet method which uses pastes, firing this, then printing or transferring the external electrodes and firing.

<Dielectric Layer Paste>

The dielectric layer paste is produced by kneading a dielectric ingredient and an organic vehicle. A powder in accordance with the composition for the dielectric layer is used for the dielectric ingredient. The method of manufacturing the dielectric ingredient is not particularly limited. Preferably, the method of mixing the subcomponent ingredients in barium titanate synthesized by the hydrothermal synthesis method etc. may be used. Further, it is possible to use a dry synthesis method of calcining a mixture of $BaCO_3$, $TiO_2$, and subcomponent ingredients to cause a solid phase reaction or possible to use the hydrothermal synthesis method. Further, it is also possible to calcine a mixture of a precipitate obtained by the coprecipitation method, sol gel method, alkali hydrolysis method, precipitation mixing method, etc. and the subcomponent ingredients. Note that for the subcomponent ingredients, use may be made of at least one of oxides or various compounds forming oxides upon firing, for example, carbonates, oxalates, nitrates, hydroxide, organic metal compounds, etc.

The organic vehicle is comprised of a binder dissolved in an organic solvent. The binder used for the organic vehicle is not particularly limited, but may be suitably selected from ethyl cellulose or another ordinary binder. Further, the organic solvent used is also not particularly limited and may be suitably selected from terpineol, butyl carbitol, acetone, toluene, and other organic solvents in accordance with the printing method, sheet method, or other method of use.

<Internal Electrode Layer Paste>

The internal electrode layer paste is prepared by kneading the electroconductive material comprised of the above various types of electroconductive metals and alloys or various types of oxides forming the above electroconductive materials after firing, an organometallic compound, resinate, etc. together with the above organic vehicle.

<External Electrode Layer Paste>

The external electrode paste is prepared in the same way as the internal electrode paste.

<Content of Organic Vehicle>

The content of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total content of these is preferably not more than 10 wt %.

<Fabrication of Green Chip>When using a printing method, the dielectric layer paste and the internal electrode layer paste are successively printed on the polyethylene terephthalate or other substrate. The result is then cut into a predetermined shape, then the pastes are peeled off from the substrate to form a green chip.

When using a sheet method, the dielectric layer paste is used to form the green sheet, the internal electrode layer paste is printed on top of the green sheet, then these are stacked, then cut to a predetermined shape to form the green chip.

<Processing to Remove Binder>

The green chip is processed to remove the binder before firing. The processing for removing the binder may be performed under ordinary conditions. If Ni or an Ni alloy or another base metal is used for the electroconductive material of the internal electrode layers, the processing is preferably performed under the following conditions:

Rate of temperature rise: 5 to 300° C./hour, particularly 10 to 100° C./hour

Holding temperature: 180 to 400° C., particularly 200 to 300° C.

Temperature holding time: 0.5 to 24 hours, particularly 5 to 20 hours

Atmosphere: air

<Firing>

The atmosphere when firing the green chip may be suitably determined in accordance with the type of the electroconductive material in the internal electrode layer paste, but when using Ni or an Ni alloy or another base metal as the electroconductive material, the oxygen partial pressure in the firing atmosphere is preferably made $10^{-8}$ to $10^{-15}$ atmospheres. If the oxygen partial pressure is less than this range, the electroconductive material of the internal electrode layer becomes abnormally sintered and ends up breaking in the middle. If the oxygen partial pressure is over this range, the internal electrode layers tend to oxidize.

The holding temperature at the time of firing is 1100 to 1400° C., more preferably 1200 to 1320° C. If the holding temperature is less than this range, the densification becomes insufficient, while if over this range, the electrodes break in the middle due to abnormal sintering of the internal electrode layers or the capacity-temperature characteristic deteriorates due to dispersion of the material comprising the internal electrode layers.

The other conditions are preferably as follows:

Rate of temperature rise: 50 to 500° C./hour, particularly 200 to 300° C./hour

Temperature holding time: 0.5 to 8 hours, particularly 1 to 3 hours

Cooling rate: 50 to 500° C./hour, particularly 200 to 300° C./hour

The firing atmosphere is preferably made a reducing atmosphere. As the atmospheric gas, for example, it is preferable to use a wet mixed gas of $N_2$ gas and $H_2$ gas.

<Annealing>

When firing in a reducing atmosphere, the capacitor chip body is preferably annealed. The annealing is for reoxidizing the dielectric layers. This enables the IR accelerated lifetime to be remarkably increased, so the reliability is increased.

The oxygen partial pressure in the annealing atmosphere is preferably at least $10^{-9}$ atm, more preferably $10^{-6}$ to $10^{-9}$ atm. If the oxygen partial pressure is less than the above range, reoxidation of the dielectric layers is difficult, while if over the above range, the internal electrode layers tend to be oxidized.

The holding temperature at the time of annealing is not more than 1100° C., more preferably 500 to 1100° C. If the holding temperature is less than the above range, the oxidation of the dielectric layers becomes insufficient, so the insulation resistance tends to deteriorate. If over the above range, not only do the internal electrode layers oxidize and the capacity fall, but also the internal electrode layers end up reacting with the dielectric material resulting in a tendency toward deterioration of the capacity-temperature characteristic and reduction of the insulation resistance. Note that the annealing may be comprised of only a temperature raising process and temperature lowering process. That is, the temperature holding time may be made zero. In this case, the holding temperature is synonymous with the maximum temperature.

The other conditions are preferably as follows:

Temperature holding time: 0 to 20 hours, particularly 2 to 10 hours

Cooling rate: 50 to 500° C./hour, particularly 100 to 300° C./hour

Note that as the atmospheric gas, wet $N_2$ gas etc. is preferably used. In the processing for removing the binder, firing, and annealing, to wet the $N_2$ gas or mixed gas, it is possible to use for example a wetter. The water temperature in this case is preferably 5 to 75° C.

The processing for removing the binder, firing, and annealing may be performed consecutively or independently. When performing these consecutively, preferably, after processing to remove the binder, the atmosphere is changed without cooling, then the temperature is raised to the holding temperature for firing, the firing performed, then the chip is cooled, the atmosphere is changed when the holding temperature of the annealing is reached, and then annealing is performed. On the other hand, when performing these independently, at the time of firing, preferably the temperature is raised to the holding temperature at the time of the processing for removing the binder in a $N_2$ gas or wet $N_2$ gas atmosphere, then the atmosphere is changed and the temperature is further raised. Preferably, the chip is cooled to the holding temperature of the annealing, then the atmosphere changed again to a $N_2$ gas or wet $N_2$ gas atmosphere and the cooling continued. Further, at the time of annealing, the temperature may be raised to the holding temperature in a $N_2$ gas atmosphere, then the atmosphere changed or the entire annealing process may be performed in a wet $N_2$ gas atmosphere.

<Formation of External Electrodes>

The thus obtained capacitor chip body is, for example, end polished using barrel polishing or sandblasting etc., then printed or transferred with an external electrode paste and fired to form the external electrodes 4. The firing conditions of the external electrode paste are for example preferably 600 to 800° C. for 10 minutes to 1 hour or so in a wet mixed gas of $N_2$ and $H_2$. Further, in accordance with need, the surfaces of the external electrodes 4 may be formed with a covering layer using plating etc.

The thus produced multilayer ceramic chip capacitor of the present invention is mounted by soldering it onto a printed circuit board for use in various types of electronic equipment.

Note that the present invention is not limited to the above embodiment in any way and may be modified in various ways within the scope of the invention.

Next, the present invention will be explained based on more specific examples, but the present invention is not limited to these examples.

EXAMPLE 1

Samples of multilayer ceramic chip capacitors were fabricated by the following procedure:

<Dielectric Layer Paste>

First, a $BaTiO_3$ ingredient powder was prepared. The ingredient powder was prepared by the solid phase method. That is, $BaCO_3+TiO_2$ was calcined at 1100° C. for 2 hours, then wet pulverized for 4 hours to obtain the $BaTiO_3$ ingredient powder. The specific surface area of the $BaTiO_3$ ingredient powder and the $I_{(200)}/Ib$ value in the X-ray diffraction chart are shown in Table 1.

Note that the specific surface area of the $BaTiO_3$ ingredient powder was measured by the BET method. Further, the X-ray diffraction chart of the ingredient powder was measured under the following conditions by a powder X-ray (Cu-Kα ray) diffraction system:

X-ray generation conditions:

Output: 45 kV-40 mA

Scan width: 0.2°/min

X-ray detection conditions:

Divergence slit: 1.0°

Scattering slit: 1.0°

Light receiving slit: 0.30 mm $MNCO_3$, $MgCO_3$, $BaCO_3$, $CaCO_3$, $SiO_2$, $Y_2O_3$, and $V_2O_5$ were added in the following composition as the first to sixth subcomponent ingredients with respect to 100 moles of the above $BaTiO_3$ ingredient powder. These were wet mixed for 16 hours by a ball mill to obtain a dielectric ingredient.

$MnCO_3$: 0.37 mole, $MgCO_3$: 0 mole, $BaCO_3$: 1.8 mole, $CaCO_3$: 1.2 moles, $SiO_2$: 3 moles, $Y_2O_3$: 2 moles, and $V_2O_5$: 0.01 mole.

Next, the dielectric ingredients and suitable amounts of an organic vehicle were further mixed by a ball mill to make a paste.

A multilayer ceramic chip capacitor was prepared using the above dielectric layer paste. First, a green sheet was formed by coating a dielectric layer paste on a PET film to give a thickness of the dielectric layer after firing of 2 μm. A Ni internal electrode paste obtained by kneading Ni and an organic vehicle was printed on this as an internal electrode layer, then the sheet was peeled from the PET film. A plurality of the thus prepared sheets were stacked and press bonded to obtain a green laminate. Four such sheets were stacked.

Next, the green laminate was cut into a predetermined size to make a green chip. This was then processed to remove the binder, fired, and annealed under the above conditions continuously to fabricate a capacitor chip body. <Processing for Removing Binder>

Rate of temperature rise: 27° C./hour

Holding temperature: 240° C.

Temperature holding time: 8 hours

Atmosphere: air

<Firing>

Rate of temperature rise: 200° C./hour

Holding temperature: suitably selected from a range of 1100 to 1400° C.

Temperature holding time: 2 hours

Atmosphere: mixed gas of wet $N_2$ and $H_2$ gas

<Annealing>

Holding temperature: 1050° C.

Temperature holding time: 2 hours

Atmosphere: wet $N_2$ gas

Oxygen partial pressure: $10^{-6}$ atmospheres

Note that a wetter was used for wetting the atmosphere gases. The water temperature was made 30° C.

<Capacitor Sample>

The external electrodes were formed by polishing the end faces of the obtained capacitor chip body by sandblasting, then coating the end faces with In—Ga electrodes as external electrodes, thereby obtaining the multilayer ceramic chip capacitor shown in FIG. 1.

The size of the thus produced multilayer ceramic chip capacitor was 3.2 mm×1.6 mm×0.5 mm.

<Measurement>

Each sample was measured as follows. The results are shown in Table 2.

Specific Permittivity εr:

The capacity of the capacitor sample was measured at 25° C. by an LCR meter under conditions of a frequency of 1 kHz and a voltage of 1 Vrms and the specific permittivity εr was calculated.

Dielectric Loss tan δ:

The dielectric loss of the capacitor sample was measured at 25° C. by an LCR meter under conditions of a frequency of 1 kHz and a voltage of 1 Vrms.

CR Product:

The insulation resistance IR at the point of time of applying 10V for 1 minute was measured at 25° C. and the CR product, that is, the product of this with the measured value of the capacity measured under the above conditions, was calculated.

Capacity-Temperature Characteristic:

The capacity was measured by an LCR meter for 25 to +85° at a frequency of 1 kHz, a voltage of 1 Vrms, and a measurement voltage of 1V and the temperature change rate of capacitance ΔC/C was calculated on the basis of a reference temperature of 20° C.

TABLE 1

| | $BaTiO_3$ | |
|---|---|---|
| Sample no. | Specific surface area ($m^2$/g) | $I_{(200)}$/Ib |
| Ex. 1 | 1.8 | 9.8 |
| Comp. 1 | 1.7 | 2.1 |
| Ex. 2 | 2.3 | 14.1 |
| Ex. 3 | 2.5 | 8.9 |
| Comp. Ex. 2 | 2.6 | 3.4 |
| Ex. 4 | 3.6 | 9.4 |
| Comp. Ex. 3 | 3.5 | 2.3 |
| Ex. 5 | 3.5 | 5.5 |

TABLE 2

| Sample no. | Permittivity εr | Dielectric loss tanδ (%) | CR product (MΩ.μF) | Temperature change rate of capacitance ΔC/C (%) −25° C. | +85° C. |
|---|---|---|---|---|---|
| Ex. 1 | 4120 | 7.5 | 1297 | −4.0 | −9.2 |
| Comp. Ex. 1 | 3240 | 10.9 | 1118 | −3.0 | −10.0 |
| Ex. 2 | 3723 | 5.5 | 1241 | −3.9 | −9.3 |
| Ex. 3 | 3820 | 6.7 | 1433 | −5.1 | −8.8 |
| Comp. Ex. 2 | 3247 | 9.6 | 1214 | −2.2 | −8.6 |
| Ex. 4 | 3404 | 6.2 | 2621 | −6.6 | −0.4 |
| Comp. Ex. 3 | 3004 | 9.2 | 1545 | −8.2 | −0.5 |
| Ex. 5 | 3352 | 7.8 | 2015 | −7.2 | −1.0 |

COMPARATIVE EXAMPLE 1

The same procedure was followed as in Example 1 to prepare a capacitor sample and perform the various tests except, as shown in Table 1, for using a $BaTiO_3$ ingredient powder (commercially available product obtained by hydrothermal synthesis method) having the specific surface area of 1.7 and the $I_{(200)}$/Ib value in the X-ray diffraction chart of 2.1. The results are shown in Table 2.

EXAMPLE 2

The same procedure was followed as in Example 1 to prepare a capacitor sample and perform the various tests except, as shown in Table 1, for using a $BaTiO_3$ ingredient powder (commercially available product obtained by hydrothermal synthesis method) having the specific surface area of 2.3 and the $I_{(200)}$/Ib value in the X-ray diffraction chart of 14.1. The results are shown in Table 2.

EXAMPLE 3

Figure 2:
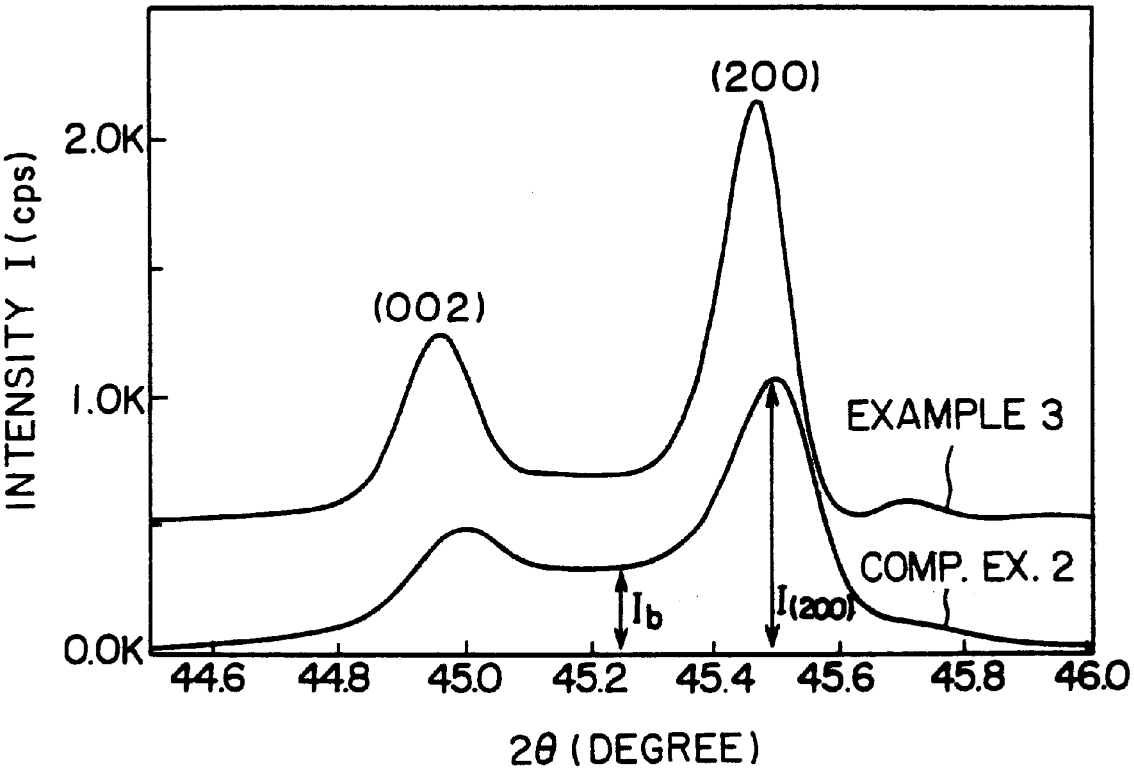
FIG. 2 is an X-ray diffraction chart of the powder ingredient according to an example of the present invention.
Figure 3:
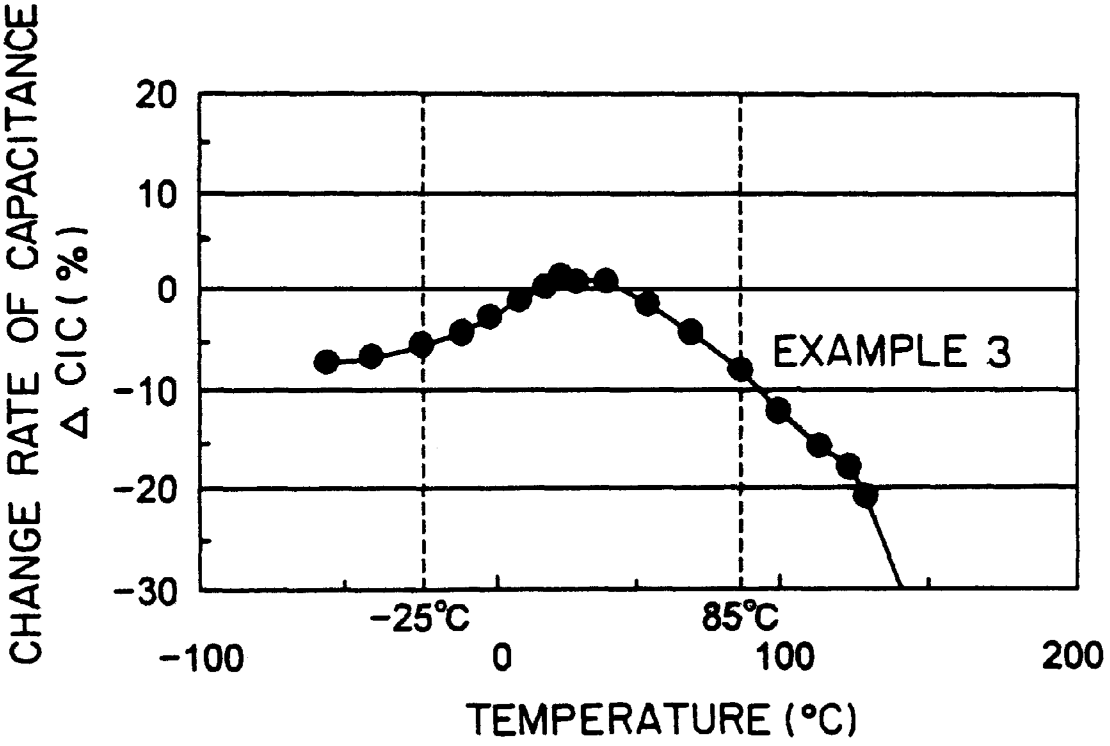
FIG. 3 is a graph of the capacity-temperature characteristics of capacitor samples according to an example of the present invention.

The same procedure was followed as in Example 1 to prepare a capacitor sample and perform the various tests except, as shown in Table 1, for using a $BaTiO_3$ ingredient powder (commercially available product obtained by hydrothermal synthesis method) having the specific surface area of 2.5 and the $I_{(200)}$/Ib value in the X-ray diffraction chart of 8.9. The results are shown in Table 2. Note that the X-ray diffraction chart of the $BaTiO_3$ ingredient powder of the present example is shown in FIG. 2 and the temperature coefficient capacitance of the capacitor is shown in FIG. 3.

COMPARATIVE EXAMPLE 2

The same procedure was followed as in Example 1 to prepare a capacitor sample and perform the various tests except, as shown in Table 1, for using a $BaTiO_3$ ingredient powder (commercially available product obtained by hydrothermal synthesis method) having the specific surface area of 2.6 and the $I_{(200)}$/Ib value in the X-ray diffraction chart of 3.4. The results are shown in Table 2. Note that the X-ray diffraction chart of the $BaTiO_3$ ingredient powder of the comparative example is shown in FIG. 2.

EXAMPLE 4

The same procedure was followed as in Example 1 to prepare a capacitor sample and perform the various tests except, as shown in Table 1, for using a $BaTiO_3$ ingredient powder (commercially available product obtained by hydrothermal synthesis method) having the specific surface area of 3.6 and the $I_{(200)}$/Ib value in the X-ray diffraction chart of 9.4. The results are shown in Table 2.

COMPARATIVE EXAMPLE 3

The same procedure was followed as in Example 1 to prepare a capacitor sample and perform the various tests except, as shown in Table 1, for using a $BaTiO_3$ ingredient powder (commercially available product obtained by hydrothermal synthesis method) having the specific surface area of 3.5 and the $I_{(200)}$/Ib value in the X-ray diffraction chart of 2.3. The results are shown in Table 2.

EXAMPLE 5

The same procedure was followed as in Example 1 to prepare a capacitor sample and perform the various tests except, as shown in Table 1, for using a $BaTiO_3$ ingredient powder (ingredient powder obtained by the same solid phase method as Example 1, but with a wet pulverization time of 16 hours) having the specific surface area of 3.5 and the $I_{(200)}$/Ib value in the X-ray diffraction chart of 5.5. The results are shown in Table 2.

Evaluation

By comparing Example 1 and Comparative Example 1 shown in Table 1 (or Example 3 and Comparative Example 2 or Example 4 and Example 5 and Comparative Example 3), when the specific surface areas of the ingredients are substantially the same and the $I_{(200)}$/Ib is 4 to 16, as shown in Table 2, the permittivity is improved and the dielectric loss can be made smaller. Further, in the example of the present invention, the CR product is improved and the temperature coefficient of capacitance satisfies the B characteristic of the JIS.

As explained above, according to the present invention, it is possible to manufacture a multilayer ceramic chip capacitor able to improve the specific permittivity (for example, to 3000 or more) and reduce the dielectric loss and superior in capacity-temperature characteristic even when the dielectric layers are thin (for example, not more than 3 $\mu$m).

What is claimed is:

1. A method of production of a multilayer ceramic chip capacitor having a capacitor body configured by alternately stacked dielectric layers and internal electrode layers, comprising using a powder ingredient of barium titanate for forming the dielectric layers, the powder ingredient having a ratio ($I_{(200}$/Ib) of a peak intensity ($I_{(200)}$) of a diffraction line of a (200) plane with respect to an intensity (Ib) at an intermediate point between an angle of a peak point of a diffraction line of a (002) plane and an angle of a peak point of a diffraction line of a (200) plane in an X-ray diffraction chart of 4 to 16.

2. The method of production of a multilayer ceramic chip capacitor as set forth in claim 1, wherein the powder ingredient of barium titanate has mixed in it a first subcomponent ingredient forming silicon oxide (first subcomponent) after firing.

3. The method of production of a multilayer ceramic chip capacitor as set forth in claim 2, wherein a molar ratio of the first subcomponent to 100 moles of the main component $BaTiO_3$, when calculating the molar ratio by converting the barium titanate included in the dielectric layers after firing to $BaTiO_3$ and the silicon oxide to $SiO_2$, is not less than 2 moles and not more than 12 moles.

4. The method of production of a multilayer ceramic chip capacitor as set forth in claim 1, wherein the powder ingredient of the barium titanate has mixed in it a second subcomponent ingredient forming a R oxide (where R is at least one type of element selected from Sc, Y, Eu, Dy, Ho, Er, Tm, Yb, and Lu; second subcomponent) after firing.

5. The method of production of a multilayer ceramic chip capacitor as set forth in claim 4, wherein a molar ratio of the second subcomponent to 100 moles of the main component $BaTiO_3$, when calculating the molar ratio by converting the barium titanate included in the dielectric layers after firing to $BaTiO_3$ and the R oxide to $R_2O_3$, is from 0 to not more than 5 moles.

6. The method of production of a multilayer ceramic chip capacitor as set forth in claim 1, wherein the powder ingredient of the barium titanate has mixed in it a third subcomponent ingredient forming at least one of magnesium oxide, zinc oxide, and chromium oxide (third subcomponent) after firing.

7. The method of production of a multilayer ceramic chip capacitor as set forth in claim 6, wherein a molar ratio of the third subcomponent to 100 moles of the main component $BaTiO_3$, when calculating the molar ratio by converting the barium titanate included in the dielectric layers after firing to $BaTiO_3$, the magnesium oxide to MgO, the zinc oxide to ZnO and the chromium oxide to ½($Cr_2O_3$) is from 0 to not more than 3 moles.

8. The method of production of a multilayer ceramic chip capacitor as set forth in claim 1, wherein the powder ingredient of the barium titanate has mixed in it a fourth subcomponent ingredient forming manganese oxide (fourth subcomponent) after firing.

9. The method of production of a multilayer ceramic chip capacitor as set forth in claim 8, wherein a molar ratio of the fourth subcomponent to 100 moles of the main component $BaTiO_3$, when calculating the molar ratio by converting the barium titanate included in the dielectric layers after firing to $BaTiO_3$ and the manganese oxide to MnO, is from 0 to not more than 1 mole.

10. The method of production of a multilayer ceramic chip capacitor as set forth in claim 1, wherein the powder ingredient of the barium titanate has mixed in it a fifth subcomponent ingredient forming at least one of barium oxide, calcium oxide, and strontium oxide (fifth subcomponent) after firing.

11. The method of production of a multilayer ceramic chip capacitor as set forth in claim 10, wherein a molar ratio of the fifth subcomponent to 100 moles of the main component $BaTiO_3$, when calculating the molar ratio by converting the barium titanate included in the dielectric layers after firing to $BaTiO_3$, the barium oxide to BaO, the calcium oxide to CaO and the strontium oxide to SrO, is from 0 to not more than 12 moles.

12. The method of production of a multilayer ceramic chip capacitor as set forth in claim 1, wherein the powder ingredient of the barium titanate has mixed in it a sixth subcomponent ingredient forming vanadium oxide (sixth subcomponent) after firing.

13. The method of production of a multilayer ceramic chip capacitor as set forth in claim 12, wherein a molar ratio of the sixth subcomponent to 100 moles of the main component $BaTiO_3$, when calculating the molar ratio by converting the barium titanate included in the dielectric layers after firing to $BaTiO_3$ and the vanadium oxide to $V_2O_5$, is from 0 to not more than 0.5 mole.

14. The method of production of a multilayer ceramic chip capacitor as set forth in claim 1, wherein the specific surface area of the powder ingredient of the barium titanate is 1.0 $m^2/g$ to 8.0 $m^2/g$.

15. The method of production of a multilayer ceramic chip capacitor as set forth in claim 1, wherein the powder ingredient of the barium titanate has mixed in it:

a first subcomponent ingredient forming silicon oxide (first subcomponent) after firing, a second subcomponent ingredient forming an R oxide (where R is at least one element selected from Sc, Y, Eu, Dy, Ho, Er, Tm, Yb, and Lu; second subcomponent) after firing, a third subcomponent ingredient forming at least one of magnesium oxide, zinc oxide, and chromium oxide (third subcomponent) after firing, a fourth subcomponent ingredient forming manganese oxide (fourth subcomponent) after firing, and at least one of barium oxide, calcium oxide, and strontium oxide (fifth subcomponent) after firing.

16. The method of production of a multilayer ceramic chip capacitor as set forth in claim 15, wherein when calculating molar ratios by converting the silicon oxide to $SiO_2$, the R oxide to $R_2O_3$, the magnesium oxide to MgO, zinc oxide to ZnO, and chromium oxide to ½ ($Cr_2O_3$), the manganese oxide to MnO, the barium oxide to BaO, the calcium oxide to CaO, and the strontium oxide to SrO, the molar ratios with respect to 100 moles of $BaTiO_3$ are the first subcomponent: not less than 2 moles and not more than 12 moles the second subcomponent: from 0 to not more than 5 moles the third subcomponent: from 0 to not more than 3 moles the fourth subcomponent: from 0 to not more than 1.0 mole the fifth subcomponent: from 0 to not more than 12 moles.

17. The method of production of a multilayer ceramic chip capacitor as set forth in claim 16, wherein:

the powder ingredient of the barium titanate has mixed in it a sixth subcomponent ingredient forming vanadium oxide (sixth subcomponent) after firing and a molar ratio of the sixth subcomponent to 100 moles of the main component $BaTiO_3$, when calculating the molar ratio by converting the barium titanate included in the dielectric layers after firing to $BaTiO_3$ and the vanadium oxide to $V_2O_5$, is from 0 to not more than 0.5 mole.

18. The method of production of a multilayer ceramic chip capacitor as set forth in claim 15, wherein the specific surface area of the powder ingredient of the barium titanate is 1.0 $m^2/g$ to 8.0 $m^2/g$.

19. The method of production of a multilayer ceramic chip capacitor as set forth in claim 16, wherein the specific surface area of the powder ingredient of the barium titanate is 1.0 $m^2/g$ to 8.0 $m^2/g$.

20. A multilayer ceramic chip capacitor having a capacitor body configured by alternately stacked dielectric layers and internal electrode layers, produced using as a powder ingredient of barium titanate for forming the dielectric layers, the powder ingredient having a ratio ($I_{(200)}/Ib$) of a peak intensity ($I_{(200)}$) of a diffraction line of a (200) plane with respect to an intensity (Ib) at an intermediate point between an angle of a peak point of diffraction line of a (002) plane and an angle of a peak point of diffraction line of a (200) plane in an X-ray diffraction chart of 4 to 16.

* * * * *